United States Patent
Tai

(10) Patent No.: US 10,597,510 B2
(45) Date of Patent: Mar. 24, 2020

(54) FLAKY GLASS GRANULES AND RESIN COMPOSITION USING THE SAME

(71) Applicant: Nippon Sheet Glass Company, Limited, Tokyo (JP)

(72) Inventor: Nobuaki Tai, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 366 days.

(21) Appl. No.: 14/377,730

(22) PCT Filed: Feb. 7, 2013

(86) PCT No.: PCT/JP2013/000683
§ 371 (c)(1),
(2) Date: Aug. 8, 2014

(87) PCT Pub. No.: WO2013/121756
PCT Pub. Date: Aug. 22, 2013

(65) Prior Publication Data
US 2015/0337110 A1    Nov. 26, 2015

(30) Foreign Application Priority Data

Feb. 16, 2012 (JP) ................................ 2012-031550

(51) Int. Cl.
| | | |
|---|---|---|
| C08K 3/40 | (2006.01) | |
| C03C 3/091 | (2006.01) | |
| C03C 12/00 | (2006.01) | |
| C03C 17/32 | (2006.01) | |
| C08K 5/54 | (2006.01) | |
| C08K 9/08 | (2006.01) | |
| C08L 63/00 | (2006.01) | |
| C08L 69/00 | (2006.01) | |
| C08K 5/544 | (2006.01) | |
| C08K 5/5435 | (2006.01) | |

(52) U.S. Cl.
CPC ................ *C08K 3/40* (2013.01); *C03C 3/091* (2013.01); *C03C 12/00* (2013.01); *C03C 17/32* (2013.01); *C08K 5/544* (2013.01); *C08K 5/5435* (2013.01); *C08K 9/08* (2013.01); *C08L 63/00* (2013.01); *C08L 69/00* (2013.01); *C08K 2201/005* (2013.01); *Y10T 428/2982* (2015.01)

(58) Field of Classification Search
CPC ... C08K 3/40; C08K 7/10; C08K 9/06; C08K 5/5435; C08K 5/544; C08K 2201/005; C03C 3/091; C03C 12/00; C03C 17/32; C08L 63/00; C08L 69/00; Y10T 428/2982
USPC .......................................................... 524/494
See application file for complete search history.

(56) References Cited

U.S. PATENT DOCUMENTS

| | | | |
|---|---|---|---|
| 3,257,184 | A | 6/1966 | Glaser |
| 5,002,827 | A | 3/1991 | Shimada et al. |
| 5,075,354 | A | 12/1991 | Mitsuuchi et al. |
| 8,383,531 | B2 | 2/2013 | Fujiwara et al. |
| 2009/0088515 | A1 | 4/2009 | Yagyu et al. |

FOREIGN PATENT DOCUMENTS

| | | |
|---|---|---|
| JP | 41-017148 B | 9/1966 |
| JP | 45-003541 B | 2/1970 |
| JP | 59-021533 | 2/1984 |
| JP | 62-109855 | 5/1987 |
| JP | 63-225554 | 9/1988 |
| JP | 2-124732 | 5/1990 |
| JP | 2-229739 | 9/1990 |
| JP | 2-503669 | 11/1990 |
| JP | 3-086753 | 4/1991 |
| JP | 5-287175 | 11/1993 |
| JP | 2002-212421 | 7/2002 |
| JP | 2003-082260 | 3/2003 |
| WO | 88/08412 | 11/1988 |
| WO | 2006/068255 | 6/2006 |
| WO | 2007/111221 | 10/2007 |

OTHER PUBLICATIONS

Extended European Search Report issued in corresponding European Patent Application Serial No. 13749943.0, dated Oct. 1, 2015, 6 pages.

*Primary Examiner* — Ling Siu Choi
*Assistant Examiner* — Ronald Grinsted
(74) *Attorney, Agent, or Firm* — Hamre, Schumann, Mueller & Larson, P.C.

(57) ABSTRACT

The flaky glass granules of the present invention include glass flakes having an average thickness of 0.1 to 2.0 μm and an average particle diameter of 10 to 2000 μm and a binder that binds the glass flakes together into the granules. The flaky glass granules contain 1.0 to 5.0% by mass of the binder in terms of solid content. The binder contains 9% by mass or less of a coupling agent. The resin composition of the present invention includes a thermoplastic resin and the flaky glass granules.

9 Claims, No Drawings

FLAKY GLASS GRANULES AND RESIN COMPOSITION USING THE SAME

TECHNICAL FIELD

The present invention relates to flaky glass granules and a resin composition containing the same.

BACKGROUND ART

Generally, glass flakes are widely used in applications such as reinforcing materials for thermosetting resins and thermoplastic resins and fillers for corrosion-resistant linings.

For example, JP 62(1987)-109855 A describes a technique for enhancing the strength and dimensional stability of a thermoplastic resin by mixing glass flakes with the thermoplastic resin. JP 63(1988)-225554 A, JP 03(1991)-086753 A, JP 05(1993)-287175 A, JP 2002-212421 A, and JP 2003-082260 A each describe that flaky glass granules formed using a binder or a surface treatment agent are mixed with a thermoplastic resin.

Since glass flakes are thin scaly particles and have high scattering properties, they have the drawback of poor workability before being mixed with thermoplastic resins. Extruders are usually used when mixing glass flakes with thermoplastic resins. Since glass flakes are bulky and have poor flowability, they have the drawbacks such as clogging of extruder feeders and poor biting property to thermoplastic resins in extruders. In order to overcome these drawbacks, there has been developed a technique in which glass flakes are formed into granules using a binder or a surface treatment agent and then the granules are mixed with a thermoplastic resin.

CITATION LIST

Patent Literature

Patent Literature 1: JP 62(1987)-109855 A
Patent Literature 2: JP 63(1988)-225554 A
Patent Literature 3: JP 03(1991)-086753 A
Patent Literature 4: JP 05(1993)-287175 A
Patent Literature 5: JP 2002-212421 A
Patent Literature 6: JP 2003-082260 A
Patent Literature 7: WO 2007/111221 A1
Patent Literature 8: JP 02(1990)-124732A

SUMMARY OF INVENTION

Technical Problem

WO 2007/111221 A1 describes the use of a flaky glass filler containing 90% by mass of glass flakes having a thickness of 0.01 µm to 2.0 µm in order to provide a resin molded article having high strength and low shrinkage. However, in the case where such thin glass flakes having a thickness of 0.01 µm to 2.0 µm are formed into granules using a binder or a surface treatment agent and then the granules are mixed with a resin, if the granules are not sufficiently kneaded for molding, they remain in the form of agglomerates of the glass flakes in the resulting resin molded article and cause a problem of impairing the appearance of the article. In addition, if the granules are strongly kneaded for molding to break the granules down into glass flakes and disperse them uniformly, the glass flakes are broken too much and cause a problem of deteriorating the strength and/or shrinkage properties of the resulting resin molded article obtained by using the glass flakes.

It is an object of the present invention to provide flaky glass granules that, when mixed with a resin, can prevent the flaky glass granules themselves from remaining in the form of agglomerates of glass flakes in the resulting resin molded article and that can achieve both effective reinforcement of the resin molded article and good appearance thereof. It is another object of the present invention to provide a resin composition containing such flaky glass granules.

Solution to Problem

The flaky glass granules of the present invention include: glass flakes having an average thickness of 0.1 to 2.0 µm and an average particle diameter of 10 to 2000 µm; and a binder that binds the glass flakes together into the granules. These flaky glass granules contain 1.0 to 5.0% by mass of the binder in terms of solid content, and the binder contains 9% by mass or less of a coupling agent.

The resin composition of the present invention includes: a thermoplastic resin; and the flaky glass granules of the present invention.

Advantageous Effects of Invention

In the flaky glass granules of the present invention, the amount of the binder attached to the glass flakes in the granules and the content of the coupling agent in the binder for granulating the glass flakes are respectively adjusted within specific ranges. Therefore, the flaky glass granules of the present invention, when mixed with a resin, can prevent the flaky glass granules themselves from remaining in the form of agglomerates of glass flakes in the resulting resin molded article. As a result, the flaky glass granules of the present invention can achieve both effective reinforcement of the resin molded article and good appearance thereof.

The resin composition of the present invention contains the flaky glass granules exhibiting the effects as described above. Therefore, the resin composition of the present invention can provide a resin molded article that is effectively reinforced by the glass flakes and has better appearance.

DESCRIPTION OF EMBODIMENTS

Hereinafter, embodiments of the present invention will be described in detail.

The flaky glass granules of the present embodiment include glass flakes and a binder that binds the glass flakes together into the granules. The flaky glass granules of the present embodiment can be produced by the steps of (I) adding a binder to a plurality of glass flakes and stirring them and (II) drying the mixture obtained by adding the binder to the glass flakes and stirring them. The flaky glass granules of the present embodiment can be obtained by using the binder to cause the plurality of glass flakes to bind together. The binder used for this purpose contains a coupling agent. It is possible to prevent the flaky glass granules, when mixed with a resin to produce a resin molded article, from remaining in the form of agglomerates of glass flakes in the resin molded article by adjusting the amount of the binder attached to the glass flakes in the flaky glass granules and the content of the coupling agent in this binder respectively within specific ranges.

The glass flakes used for producing the flaky glass granules of the present embodiment can be produced by, for example, a so-called blowing method as disclosed in JP 41(1966)-017148 B and JP 45(1970)-003541 B, or a so-called rotary method as disclosed in JP 59(1984)-021533 A and JP02(1990)-503669 T.

In the blowing method, a nozzle is put in a liquid tank containing molten glass, air is blown through the nozzle to inflate the molten glass into a so-called balloon, and the balloon is drawn by rollers so as to obtain glass flakes. In the rotary method, molten glass is poured continuously into a rapidly rotating flat plate or bowl, and the molten glass is stretched over a rim of the plate or the bowl so as to obtain glass flakes.

A commonly known glass composition can be used as the composition of the glass flakes. Specifically, a glass having a low content of alkali metal oxides, such as E glass, can suitably be used. The typical composition of E glass is as follows. The content of each component is given in mass %.

$SiO_2$: 52 to 56,
$Al_2O_3$: 12 to 16,
CaO: 16 to 25,
MgO: 0 to 6,
$Na_2O+K_2$: 0 to 2 (preferably 0 to 0.8),
$B_2O_3$: 5 to 13, and
$F_2$: 0 to 0.5

As a glass having a low content of alkali metal oxides, a glass composition substantially free of $B_2O_3$, F, ZnO, BaO, SrO, and $ZrO_2$ but containing the following components can be used. The content of each of the following components is given in mass %.

$59 \leq SiO_2 \leq 65$,
$8 \leq Al_2O_3 \leq 15$,
$47 \leq (SiO_2 - Al_2O_3) \leq 57$,
$1 \leq MgO \leq 5$,
$20 \leq CaO \leq 30$,
$0 \leq (Li_2O + Na_2O + K_2O) < 2$, and
$0 \leq TiO_2 \leq 5$.

This glass composition is disclosed by the present applicant in WO 2006/068255 A1.

As used herein, "a composition substantially free of a component" means that the component is not intentionally added to the composition but may be unavoidably present therein, for example, due to an industrial raw material. Specifically, it means that the contents of $B_2O_3$, F, ZnO, BaO, SrO and $ZrO_2$ are each less than 0.1% by mass (preferably less than 0.05% by mass, and more preferably less than 0.03% by mass).

The average thickness and the average particle diameter of the glass flakes are not particularly limited. However, thin glass flakes have a large volume per unit weight because they have a low bulk density. Thus, granulation of these thin glass flakes is significantly effective in reducing the volume of the resulting flaky glass granules. In light of this, the use of thin glass flakes as a raw material of flaky glass granules is effective in terms of workability and space for storage. Specifically, when producing the flaky glass granules, it is extremely effective, in terms of workability and space for storage, to use glass flakes with an average thickness of 2.0 µm or less and an aspect ratio (a value obtained by dividing the average particle diameter by the average thickness) of 50 or more. In view of the technical difficulty and economic efficiency of the product, the average thickness is preferably 0.1 µm or more. Furthermore, the average particle diameter is preferably 10 to 2000 µm in order to make the glass flakes more effective in reinforcing the resin and reducing the mold shrinkage of the resin. The average aspect ratio is preferably 2000 or less for dispersibility of the glass flakes into the resin. In this description, the average thickness of the glass flakes is a value obtained in the following manner. 100 or more glass flakes are sampled from the glass flakes. The thickness of each of these glass flake samples is measured using a scanning electron microscope (SEM), and the total thickness of the samples measured is divided by the number of the samples. The average particle diameter is defined as a particle diameter (D50) at which a cumulative mass distribution of particle sizes reaches 50% in a particle size distribution measured based on a laser diffraction/scattering method.

As described above, in the present embodiment, the flaky glass granules are produced by adding a binder to the glass flakes, and stirring and drying them. Specific methods for adding the binder, and stirring and drying them are not particularly limited. Examples thereof will be described hereinafter.

For example, a specific amount of the binder is sprayed to the rotating glass flakes in a mixer, such as a rotary disk mixer or a Henschel mixer having a mixing chamber equipped with a rotary blade, and the glass flakes and the binder are mixed and stirred. Next, the resulting glass flakes are dried with stirring in the mixer, or the resulting glass flakes are removed from the mixer and dried. The flaky glass granules can be obtained in this manner.

As another example, it is also possible to produce the flaky glass granules using a tumbling granulation method as described in JP 02(1990)-124732A. More specifically, the flaky glass granules can also be produced by putting the glass flakes into a horizontal vibration granulation machine equipped with a stirring blade and spraying the binder thereto to granulate the glass flakes.

The flaky glass granules can also be produced not only by the above-mentioned methods but also by known methods that are generally called a stirring granulation method, a fluidized bed granulation method, a spraying granulation method, and a tumbling granulation method.

The drying step is performed in the following manner, for example. The flaky glass granules are heated to a temperature equal to or higher than the boiling point of a solvent for liquefying the binder used, so as to dry them until the solvent is volatilized.

The binder is not particularly limited, but contains an adhesive component used to granulate the glass flakes and to increase the compatibility between the molding resin and the glass flakes and a coupling agent component that reacts with the surface of the glass flakes so as to increase the compatibility between the surface of the glass and the molding resin. The binder may further contain a lubricant component such as an oil solution or a surfactant.

The adhesive component in the binder is not particularly limited. Examples of organic binding components include methyl cellulose, carboxymethyl cellulose, starch, carboxymethyl starch, hydroxyethyl cellulose, hydroxypropyl cellulose, polyvinyl alcohol, acrylic resin, epoxy resin, phenolic resin, vinyl acetate, and polyurethane resin. Examples of inorganic binding components include water glass, colloidal silica, and colloidal alumina.

The coupling agent component is not particularly limited. Examples of the coupling agent component include silane coupling agents, titanium-based coupling agents, aluminum-based coupling agents, and zirconia-based coupling agents. The mixtures of these can also be used. Examples of the silane coupling agents include γ-aminopropyltrimethoxysilane, γ-aminopropyltriethoxysilane, N-β-aminoethyl-γ-aminopropyltrimethoxysilane, γ-glycidoxypropyltrimethoxysilane, vinyltriethoxysilane, and γ-methacryloxypropyltrimethoxysilane.

The method for producing the binder is not particularly limited. For example, a solution containing the binder (a binder solution) can be produced by adding as appropriate an adhesive component, a coupling agent component, and others into a solvent at ordinary temperature and under atmospheric pressure, and then stirring the resulting solution until all the components are homogeneously mixed.

The amount of the binder attached to the glass flakes in the flaky glass granules can be controlled by adjusting the concentration of the binder to be added or sprayed. Specifically, the flaky glass granules containing a predetermined amount of the binder attached to the glass flakes can be produced by adding or spraying a predetermined amount of a binder solution to a predetermined amount of the glass flakes so that a predetermined solid content of the binder is added to the predetermined amount of the glass flakes.

The glass flakes constituting the flaky glass granules have an average thickness of 0.1 to 2.0 µm and an average particle diameter of 10 to 2000 µm. The flaky glass granules contain 1.0 to 5.0% by mass of the binder in terms of solid content. When the amount of the binder attached to the glass flakes is less than 1.0% by mass, the binder cannot adequately coat the glass flakes and thus leads to a decrease in the molecular weight of the molding resin, which may cause a decrease in the strength of the resulting article. In particular, when the resin is polycarbonate, the glass flakes in the resin promote a decrease in the molecular weight of the resin, the amount of the binder attached is preferably 1.0% by mass or more. When the amount of the binder attached to the glass flakes is more than 5.0% by mass, gas is generated during extrusion molding, which may cause problems such as contamination of a mold and discoloration of the resulting resin molded article. When the amount of the binder attached exceeds 5% by mass, the binding force between the glass flakes becomes too strong. Therefore, if the flaky glass granules and the resin are not sufficiently kneaded for resin molding, the granules remain in the form of agglomerates of glass flakes in the resulting resin molded article and degrade the appearance of the article.

The content of the coupling agent in the binder is more than 0% by mass and 9% by mass or less, preferably 0.1% by mass or more and 9% by mass or less, more preferably 0.1% by mass or more and 6% by mass or less, further preferably 0.1% by mass or more and 4% by mass or less, and particularly preferably 0.1% by mass or more and 1.9% by mass or less. When the content of the coupling agent is more than 9% by mass, if the flaky glass granules and the resin are not sufficiently kneaded for resin molding, the granules remain in the form of agglomerates of glass flakes in the resulting resin molded article and degrade the appearance of the article. When the content of the coupling agent is 9% by mass or less, the resulting flaky glass granules, when mixed with a resin, can prevent the flaky glass granules themselves from remaining in the form of agglomerates of glass flakes in the resulting resin molded article. As a result, a resin molded article having good appearance can be obtained without impairing its high strength and low shrinkage properties.

Next, the resin composition of the present embodiment will be described.

The resin composition of the present embodiment contains the flaky glass granules of the present embodiment as described above and a thermoplastic resin.

The thermoplastic resin is not particularly limited. Examples of the thermoplastic resin include polyvinyl chloride, polypropylene, polyethylene, polystyrene, polyester, polyamide, polycarbonate, polybutylene, polybutylene terephthalate, copolymers of these, polyphenylene sulfide, polyphenylene ether, polyether ether ketone, and liquid crystal polymers (type I, type II, and type III).

The content of the flaky glass granules in the resin composition is preferably 5 to 70% by mass. When the content of the flaky glass granules is 5% by mass or more, they can fully exert their function as a reinforcing material. On the other hand, when the content of the flaky glass granules is 70% by mass or less, they can be uniformly dispersed in the resin composition. In order to keep the molding shrinkage lower, it is more preferable that the content of the flaky glass granules be 30% by mass or more.

The resin composition may contain another reinforcing material such as glass fibers in addition to the flaky glass granules in some applications. For example, when the resin composition is used for components of electrical/electronic devices, it requires a very high strength. Therefore, about the same amount of glass fibers and flaky glass granules may be added.

The resin molded article produced using the resin composition of the present embodiment can have a high tensile strength and a high flexural strength by the reinforcing effect of the flaky glass granules. In addition, the resin composition of the present embodiment has a low mold shrinkage, and therefore provides a resin molded article having excellent dimensional stability. Furthermore, the average thickness of the glass flakes contained in the resin composition of the present embodiment is smaller than that of conventional glass flakes. Therefore, the resin composition of the present embodiment can provide a molded article having a smooth surface with a lower surface roughness.

EXAMPLES

Hereinafter, the present invention will be described in more detail with reference to Examples, but the present invention is not limited to the following Examples as long as it does not depart from the scope thereof.

Examples 1 to 9

First, glass flakes were produced from E glass having the composition shown in Table 1 by the blowing method. Specifically, the E glass was poured into a melting tank heated to 1200° C. or higher to melt the glass. A nozzle was put in the melting tank, and the molten glass was inflated with air fed through the nozzle to form a thin glass sheet. Then, the thin glass sheet was drawn continuously out of the tank by rollers. A glass sheet with an average thickness of 0.7 µm was obtained by adjusting the amount of air to be fed and the rotational speed of the rollers. Then, the glass sheet was crushed into small particles and the particles were sized. Thus, glass flakes with an average particle diameter of 160 µm were obtained.

TABLE 1

| | (Unit: mass %) |
| --- | --- |
| | E glass |
| $SiO_2$ | 54.7 |
| $Al_2O_3$ | 14.0 |
| CaO | 23.4 |
| MgO | 0.3 |
| $Na_2O$ | 0.4 |
| $K_2O$ | 0.2 |
| $B_2O_3$ | 5.8 |
| Others | 1.2 |

Next, 5 kg of the glass flakes was put into a Henschel mixer, and stirred and mixed for 15 minutes while a binder solution was sprayed to the glass flakes. The binder solution contained an epoxy resin as an adhesive component, a mixture of γ-glycidoxypropyltrimethoxysilane and γ-aminopropyltriethoxysilane as a coupling agent component, and water as a solvent. The content of the coupling agent component in the solid content of the binder solution used in each of Examples 1 to 9 are shown in Tables 3 and 4.

Then, the glass flakes were removed from the mixer and dried in a dryer at 125° C. for 8 hours. Thus, flaky glass granules of Examples 1 to 9 were obtained.

The flaky glass granules of each Example were mixed and kneaded with polycarbonate in an extruder, and the resulting resin mixture was molded by an injection molding machine. The content of the flaky glass granules in the resulting resin molded article was 30% by mass.

Measurement of the amount of the binder attached in the flaky glass granules, measurement of the properties of the molded article, melt flow rate (MFR) measurement for evaluating a decrease in the molecular weight of the resin, and evaluation of agglomeration in the molded article were carried out by the following methods.

The amount of the binder attached in the flaky glass granules was determined by the ignition loss method. Specifically, an appropriate amount of flaky glass granules were sampled from the obtained flaky glass granules. These sample granules were dried at 110° C., and then heated in an atmosphere at 625° C. to remove the binder from the surface of the glass flakes. The amount of the binder attached in the flaky glass granules was calculated from the difference between the mass of the unheated flaky glass granules and the mass of the heated flaky glass granules. Tables 3 and 4 show the results.

As the properties of each resin molded article, the maximum tensile strength, tensile modulus, tensile strain, maximum flexural strength, flexural modulus, flexural strain, and Izod impact strength of the resin molded article were measured. The maximum tensile strength, the tensile modulus, and the tensile strain were measured according to JIS K 7113. The maximum flexural strength, the flexural modulus, and the flexural strain were measured according to JIS K 7171. The Izod impact strength was measured according to JIS K 7110. Tables 3 and 4 show the results.

The MFR is known as a parameter as a measure of the molecular weight of a resin. Generally, the MFR is expressed as the amount of molten resin extruded from a cylinder through an orifice for 10 minutes by applying an appropriate load to the molten resin in the cylinder. The MFR is the measure of the viscosity of the molten resin but is also related to the molecular weight thereof. That is, the higher the molecular weight of a resin, the lower the MFR thereof. The lower the molecular weight of a resin, the higher the MFR thereof. As the molecular weight of a resin increases, the strength of the resulting resin molded article tends to increase. In Examples, the MFR was measured under the conditions at a temperature of 270° C. and a load of 2.16 kg according to JIS K 7210. When the MFR of the resin was 11 g/10 min. or less, the resin was rated good. That is, it was determined that a decrease in the molecular weight of the resin was small. Tables 3 and 4 show the results.

Agglomeration in each molded article was evaluated by visual observation of the appearance of the molded articles and based on the evaluation criteria shown in Table 2 below. Tables 3 and 4 show the results.

TABLE 2

| Rating | Agglomeration and Appearance |
| --- | --- |
| 1 | Agglomeration was observed |
| 2 | No agglomeration but a certain degree of non-uniformity |
| 3 | No agglomeration but slight non-uniformity |
| 4 | No agglomeration and good appearance |

Comparative Examples 1 to 5

Flaky glass granules of Comparative Examples 1 to 5 and resin molded articles containing 30% by mass of these flaky glass granules were obtained in the same manner as in Examples 1 to 9, except that the contents of the components (contents of the adhesive component and the coupling agent component) in the solid content of each binder solution and the concentration of the binder in the binder solution used for granulation of glass flakes were adjusted. Furthermore, measurement of the amount of the binder attached in the flaky glass granules, measurement of the properties of the molded article, measurement of the MFR, and evaluation of agglomeration in the molded article were carried out in the same manner as in Examples 1 to 9. Table 5 shows the contents of the coupling agent component in the binder, the amounts of the binder attached, the properties of the molded article, the results of the MFT measurement, and the results of the evaluation of agglomeration in the molded article.

TABLE 3

|  |  | Example 1 | Example 2 | Example 3 | Example 4 |
| --- | --- | --- | --- | --- | --- |
| Content of coupling agent in binder (%) |  | 0.1 | 0.5 | 1.8 | 1.9 |
| Amount of binder attached (%) |  | 2.72 | 2.73 | 2.71 | 2.72 |
| Properties of molded article | Maximum tensile strength (MPa) | 87.7 | 88.9 | 91.8 | 92.4 |
|  | Tensile modulus (MPa) | 3921 | 3849 | 4012 | 4169 |
|  | Tensile strain (%) | 3.2 | 3.2 | 3.5 | 3.5 |
|  | Maximum flexural strength (MPa) | 137.3 | 138.6 | 137.6 | 138.6 |
|  | Flexural modulus (MPa) | 5861 | 5959 | 6011 | 6081 |
|  | Flexural strain (%) | 3.2 | 3.2 | 3.3 | 3.3 |
|  | Izod impact strength UN[1] (kJ/m$^2$) | 26.5 | 29.2 | 30.5 | 31.0 |
|  | Izod impact strength N[2] (kJ/m$^2$) | 3.14 | 3.40 | 3.41 | 3.51 |
| MFR (g/10 min) |  | 7.4 | 7.2 | 7.2 | 7.4 |
| Agglomeration in molded article |  | 4 | 4 | 4 | 4 |

Note:
*[1]unnotched
*[2]notched

TABLE 4

|  | Example 5 | Example 6 | Example 7 | Example 8 | Example 9 |
| --- | --- | --- | --- | --- | --- |
| Content of coupling agent in binder (%) | 1.9 | 1.9 | 4.0 | 9.0 | 9.0 |
| Amount of binder attached (%) | 1.20 | 4.20 | 2.81 | 2.85 | 4.20 |

TABLE 4-continued

|  |  | Example 5 | Example 6 | Example 7 | Example 8 | Example 9 |
|---|---|---|---|---|---|---|
| Properties of molded article | Maximum tensile strength (MPa) | 86.1 | 90.6 | 90.6 | 91.6 | 91.3 |
|  | Tensile modulus (MPa) | 4102 | 3868 | 4135 | 4159 | 3850 |
|  | Tensile strain (%) | 3.2 | 3.5 | 3.5 | 3.5 | 3.5 |
|  | Maximum flexural strength (MPa) | 131.5 | 138.8 | 140.9 | 141.4 | 140.7 |
|  | Flexural modulus (MPa) | 5929 | 6115 | 5962 | 5993 | 5990 |
|  | Flexural strain (%) | 3.2 | 3.2 | 3.1 | 3.3 | 3.3 |
|  | Izod impact strength UN[*1] (kJ/m$^2$) | 27.1 | 30.6 | 30.9 | 31.0 | 30.8 |
|  | Izod impact strength N[*2] (kJ/m$^2$) | 3.02 | 3.46 | 3.48 | 3.46 | 3.48 |
|  | MFR (g/10 min) | 9.7 | 7.3 | 8.3 | 9.3 | 9.2 |
| Agglomeration in molded article |  | 4 | 4 | 3 | 2 | 2 |

Note:
[*1] unnotched
[*2] notched

TABLE 5

|  |  | Com. Example 1 | Com. Example 2 | Com. Example 3 | Com. Example 4 | Com. Example 5 |
|---|---|---|---|---|---|---|
| Content of coupling agent in binder (%) |  | 14.0 | 18.0 | 9.0 | 18.0 | 4.0 |
| Amount of binder attached (%) |  | 2.88 | 2.90 | 0.6 | 0.9 | 5.20 |
| Properties of molded article | Maximum tensile strength (MPa) | 90.3 | 90.1 | 80.7 | 85.8 | 90.7 |
|  | Tensile modulus (MPa) | 4160 | 4140 | 3359 | 3652 | 3737 |
|  | Tensile strain (%) | 3.6 | 3.6 | 3.2 | 3.2 | 3.6 |
|  | Maximum flexural strength (MPa) | 131.3 | 133.8 | 123.7 | 128.5 | 137.9 |
|  | Flexural modulus (MPa) | 5960 | 5970 | 5608 | 6050 | 5811 |
|  | Flexural strain (%) | 3.3 | 3.2 | 3.0 | 2.8 | 3.5 |
|  | Izod impact strength UN[*1] (kJ/m$^2$) | 30.8 | 30.6 | 22.3 | 22.7 | 34.3 |
|  | Izod impact strength N[*2] (kJ/m$^2$) | 3.48 | 3.50 | 2.93 | 2.81 | 3.34 |
|  | MFR (g/10 min) | 10.1 | 10.3 | 14.7 | 11.9 | 7.4 |
| Agglomeration in molded article |  | 1 | 1 | 4 | 4 | 1 |

Note:
[*1] unnotched
[*2] notched

The results of Examples 1 to 9 shown in Tables 3 and 4 were compared with the results of Comparative Examples 1 to 5 shown in Table 5. As a result, it was found that the resin molded articles of Examples 1 to 9 had both high strength properties and good appearances. Specifically, Examples 1 to 4, 7, and 8 were compared with Comparative Examples 1 and 2, which were similar in the amount of the binder attached. As a result, it was found that the strength properties of these resin molded articles were at about the same level, but agglomeration of glass flakes was observed in the molded articles obtained by using the binder containing more than 9% by mass of the coupling agent and their appearances were very poor, whereas no agglomeration of glass flakes was observed in the molded articles obtained by using the binder containing 9% by mass or less of the coupling agent. Furthermore, in Comparative Examples 3 and 4 in which the amount of the binder attached was less than 1.0% by mass, the MFRs were higher than 11 g/10 min, which means that the molecular weights of the resins decreased. Due to the decrease in the molecular weights of the resins, the strength properties of the resin molded articles of Comparative Examples 3 and 4 were inferior to those of other Comparative Examples and Examples. In Comparative Example 5 in which the amount of the binder attached was more than 5.0% by mass, agglomeration of glass flakes was observed in the molded article and the appearance was very poor.

In Examples 1 to 7 in which the content of the coupling agent in the binder was 4% by mass or less, agglomeration in the resin molded articles was rated 3 and 4 and their appearances were better. Furthermore, in Examples 1 to 6 in which the content of the coupling agent in the binder was 1.9% by mass or less, agglomeration in the resin molded articles were rated 4 and their appearances were particularly good.

INDUSTRIAL APPLICABILITY

The flaky glass granules of the present invention, when mixed with a resin, can achieve both effective reinforcement of the resulting resin molded article and good appearance thereof, and therefore can be used in various applications.

For example, resin compositions containing the flaky glass granules of the present invention and polycarbonate are suitable for use in various fields such as automobiles and electrical/electronic components.

The invention claimed is:

1. Flaky glass granules comprising:
   glass flakes having an average thickness of 0.1 to 2.0 μm and an average particle diameter of 10 to 2000 μm; and
   a binder that binds the glass flakes together into the flaky glass granules,
   wherein the flaky glass granules comprise 1.0 to 5.0% by mass of the binder in terms of solid content, and
   the binder contains an adhesive component and 0.1 to 9% by mass of the binder of a coupling agent.

2. A resin composition comprising:
   a thermoplastic resin; and
   the flaky glass granules according to claim 1.

3. The resin composition according to claim 2, wherein the thermoplastic resin is polycarbonate.

4. The flaky glass granules of claim 1, wherein the binder contains 0.1 to 6% by mass of the binder of the coupling agent.

5. The flaky glass granules of claim 1, wherein the binder contains 0.1 to 4% by mass of the binder of the coupling agent.

6. The flaky glass granules of claim 1, wherein the binder contains 0.1 to 1.9% by mass of the binder of the coupling agent.

7. The flaky glass granules of claim 1, wherein the amount of the coupling agent by mass relative to the amount of the adhesive component by mass is 0.10 to 9.89%.

8. The flaky glass granules of claim 1, wherein the amount of the coupling agent by mass relative to the amount of the adhesive component by mass is 0.10 to 4.17%.

9. The flaky glass granules of claim 1, wherein the amount of the coupling agent by mass relative to the amount of the adhesive component by mass is 0.10 to 1.94%.

* * * * *

UNITED STATES PATENT AND TRADEMARK OFFICE
CERTIFICATE OF CORRECTION

PATENT NO. : 10,597,510 B2
APPLICATION NO. : 14/377730
DATED : March 24, 2020
INVENTOR(S) : Tai Page 1 of 1

It is certified that error appears in the above-identified patent and that said Letters Patent is hereby corrected as shown below:

In the Specification

Column 3, Line 35, delete "$0 \leq$" and insert -- $0 <$ --.

Signed and Sealed this
Fourth Day of August, 2020

Andrei Iancu
*Director of the United States Patent and Trademark Office*